(12) United States Patent
Bill et al.

(10) Patent No.: US 8,840,081 B2
(45) Date of Patent: Sep. 23, 2014

(54) PILOTED VALVE, PARTICULARLY PROPORTIONAL THROTTLE VALVE

(75) Inventors: Markus Bill, Heusweiler (DE); Peter Bruck, Althornbach (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 766 days.

(21) Appl. No.: 12/735,445

(22) PCT Filed: Dec. 16, 2008

(86) PCT No.: PCT/EP2008/010681
§ 371 (c)(1),
(2), (4) Date: Aug. 10, 2010

(87) PCT Pub. No.: WO2009/095061
PCT Pub. Date: Aug. 6, 2009

(65) Prior Publication Data
US 2010/0294962 A1 Nov. 25, 2010

(30) Foreign Application Priority Data
Jan. 29, 2008 (DE) .......................... 10 2008 006 380

(51) Int. Cl.
*F16K 31/12* (2006.01)
*F16K 31/40* (2006.01)
(52) U.S. Cl.
CPC .................................. *F16K 31/408* (2013.01)
USPC ........................................ 251/30.04; 251/28
(58) Field of Classification Search
USPC ................................. 251/30.01–30.04, 28, 25
See application file for complete search history.

(56) References Cited

U.S. PATENT DOCUMENTS 2,625,953 A 1/1953 Miller
4,018,249 A * 4/1977 Lameyre .................. 137/624.11
(Continued)

FOREIGN PATENT DOCUMENTS

DE 10 2004 022 820 A1 4/2005
DE 103 43 608 A1 4/2005
GB 1 196 505 A 6/1970

*Primary Examiner* — John K Fristoe, Jr.
*Assistant Examiner* — Angelisa Hicks
(74) *Attorney, Agent, or Firm* — Roylance, Abrams, Berdo & Goodman L.L.P.

(57) ABSTRACT

A piloted proportional throttle valve has a valve piston (29) displaceably guided in the longitudinal direction in a valve housing (13) having a fluid inlet (2) and outlet (1). The front side of the valve piston (27) can be pressurized against a main valve seat (25) by fluid pressure acting on its back side. A pilot valve device has an actuating member (7) displaceable in the longitudinal direction by an electrically actuatable magnet system (4), and works with a pilot valve seat (37) in a bore (17) of the valve piston (29) connecting its back side to the fluid outlet (1) on the front side of the piston. The fluid pressure on the back side of the piston (29) is reduced for an opening motion when the pilot valve seat (33) is released. A flow baffle device (39) is disposed between the back side of the piston and the fluid inlet (2) of the housing (13) to build up the fluid pressure pressurizing the piston (29) against its closed position by introducing pilot fluid. The flow baffle device (39) has a device for performing filtration, preferably gap filtration, of the pilot fluid.

18 Claims, 5 Drawing Sheets

(56) References Cited

U.S. PATENT DOCUMENTS

| | | | |
|---|---|---|---|
| 4,966,195 A * | 10/1990 | McCabe | 137/625.61 |
| 4,967,786 A | 11/1990 | DuHack | |
| 5,048,790 A * | 9/1991 | Wells | 251/30.04 |
| 5,205,531 A * | 4/1993 | Kolchinsky | 251/30.04 |
| 8,066,255 B2 * | 11/2011 | Wang | 251/30.04 |
| 2003/0020033 A1 | 1/2003 | Wang | |
| 2004/0108001 A1 | 6/2004 | Slawinski et al. | |
| 2006/0273270 A1 * | 12/2006 | Bill et al. | 251/44 |

* cited by examiner

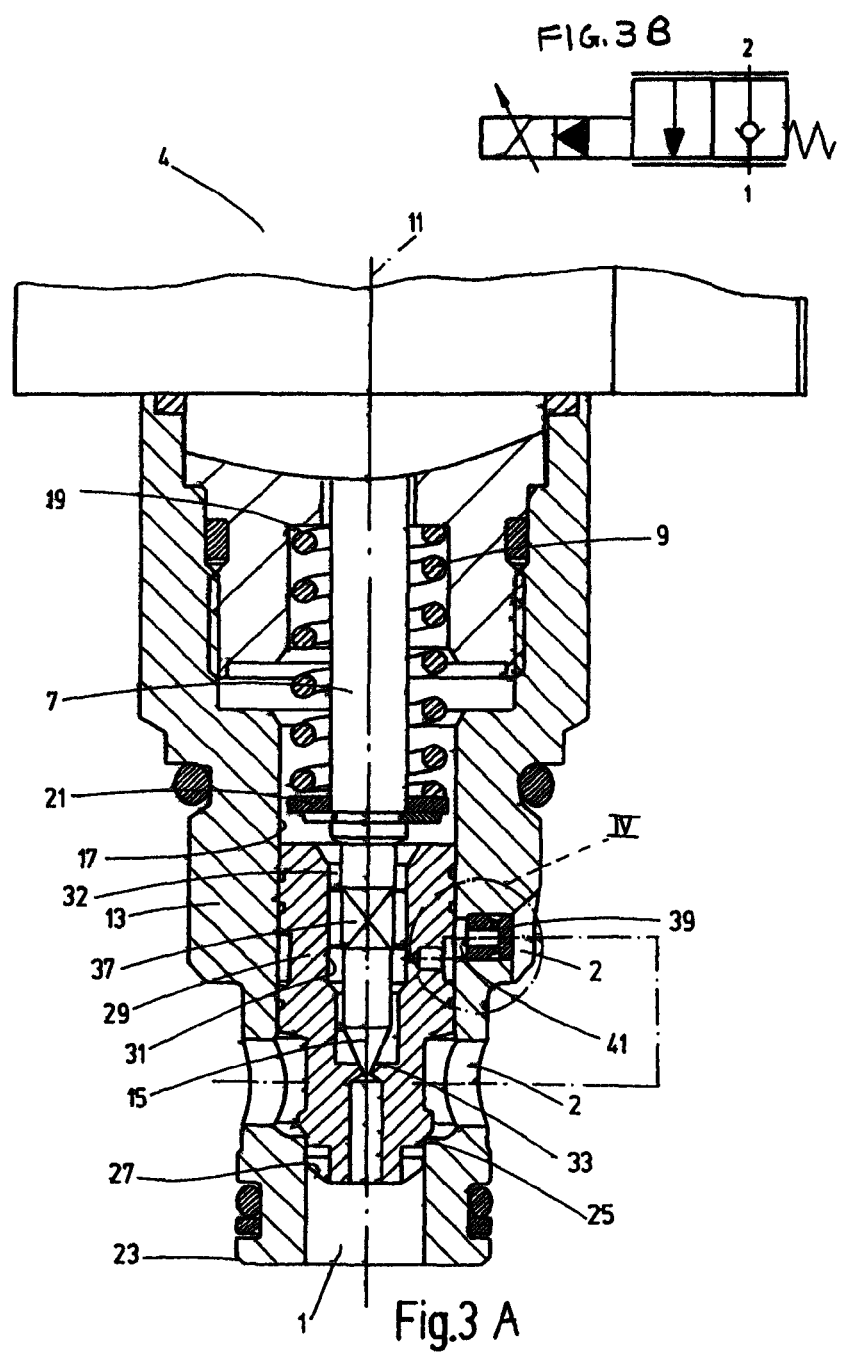

PILOTED VALVE, PARTICULARLY PROPORTIONAL THROTTLE VALVE

FIELD OF THE INVENTION

The invention relates to a piloted valve, particularly a piloted proportional throttle valve, with a valve piston guided to move in the longitudinal direction in a valve housing with a fluid inlet and fluid outlet. The valve piston can be pressurized by the fluid pressure active on its back side with its front side pressed against a main valve seat. A pilot valve device has an actuating member movable in the longitudinal direction by an electrically triggerable magnet system and interacts with the pilot valve seat in a bore of the valve piston connecting the valve piston back side to the fluid outlet on the front side of the piston to reduce the fluid pressure on the back side of the piston for an opening motion when the pilot valve seat is cleared. To build up the fluid pressure pressurizing the piston against its closed position by supply of pilot fluid, a flow baffle device is present between the back of the piston and the fluid inlet of the housing.

BACKGROUND OF THE INVENTION

Proportional throttle valves are generally used in fluid systems for controlling volumetric flows. In this connection, directly controlled valves in which a proportional magnet system acts directly on the control piston, as in a switching directional control valve, have proven less suited in those cases in which large volumetric flows, especially at high differential pressures, must be controlled. Flow forces may arise that superimpose themselves on the actuating forces of the magnet system to lead to malfunctions.

To remedy this problem, state of the art valves of the initially indicated type for these applications, i.e., those proportional throttle valves having hydraulic piloting, are used. When using these conventional valves, problems arise with respect to operating behavior. Although mechanical decoupling of the valve piston from the magnet system helps to reduce instabilities, because the valve piston is moved solely by fluid pressure, the precision and reliability of operation depend largely on the state of the flow baffle device of the pilot system. In use in a fluid system in which the fluid is not free of fouling, clogging of the baffle bore of the baffle device would lead to uncontrolled opening of the valve presenting a safety hazard. To prevent this danger, the baffle bore is typically made relatively large, with a diameter of more than 0.5 mm. Since the diameter of the pilot valve seat must be chosen to be larger than the diameter of the baffle bore to perform the valve function, several problems arise. One major disadvantage is that large diameters of the baffle bore and pilot valve seat lead to a large pilot volumetric flow. For correspondingly large pressure differences, this volumetric flow can be several liters/min. Precision control of the valve is not possible in this volumetric flow range.

The differential pressure prevailing on the pilot valve seat and on the valve cone of the actuating member, which cone interacts with the valve seat, produces a resulting force that seeks to keep the valve cone in the closed position. In particular, at high differential pressures a relatively large dead flow is thus necessary to raise the actuating member off the pilot valve seat. After the pilot valve seat is cleared, a rapid pressure drop occurs on the back of the piston to greatly reduce the force acting on the actuating element. In the presence of a large magnetic force remaining unchanged, an excess of force of the magnet system arises. It acts against the force of a spring arrangement conventionally pressurizing the actuating element against the pilot valve seat, as a result of which an opening motion of the valve piston takes place with undesired suddenness.

SUMMARY OF THE INVENTION

An object of the invention is to provide a piloted valve, particularly a proportional throttle valve, characterized by especially good and reliable operating behavior with a simple structure.

According to the invention, this object is basically achieved by a valve having measures for filtration, preferably for gap filtration of the pilot fluid, such that the aforementioned difficulties can be avoided. Avoiding the risk of fouling of the baffle device allows the diameter of the baffle bore and pilot valve seat to be made much smaller compared to the prior art. The resulting reduction of the pilot volumetric flow enables precision control of the valve even in the case of high pressure differences and in the range of small fluid volumetric flows to be controlled. Moreover, the reduction of the diameter of the pilot valve seat promotes stable operating behavior when the valve cone of the actuating element is lifted off the pilot valve seat because sudden movements in the opening process are avoided, thus promoting precision control.

Special advantages arise when there is gap filtration of the pilot fluid. For a corresponding gap length, the gap width, compared to the opening cross section of the pertinent baffle bore, can be chosen to be small enough. Extremely fine dirt particles are then reliably retained, but as a result of the gap length the required flow cross section is available for passage of the pilot fluid.

In especially advantageous exemplary embodiments, the flow baffle device is inserted into a pilot channel extending with the channel axis radially to the longitudinal axis in the wall of the valve housing between the inner channel mouth fluid-connected to the back of the valve piston, and an outer channel mouth, which is connected to the fluid inlet. This construction permits integrating a device for gap filtration in the pilot channel directly into the valve housing.

In this case, advantageously the pilot channel is formed by a round channel bore in which the baffle device is held in the form of a round insert body. It can be configured such that it both performs the baffle function and forms the gap filtration component.

In this case, the insert body has a plug section facing the inner channel mouth and sitting appropriately in the channel bore. An outer section is reduced in diameter in comparison, and on which a baffle bore and a gap filter device are made.

In an especially advantageous and simple construction, in the plug section a coaxial blind hole extends away from the inner channel mouth into the outer section. The baffle bore in the direction radial to the channel axis extends between the blind hole and the outside of the outer section of the insert body, which section has a reduced diameter.

With an insert body configured in this way, the gap filtration device can be implemented especially easily in that the diameter of the outer section of the insert body is stepped. A first region of length into which the baffle bore discharges then has a smaller diameter than the region of length following to the outside, which smaller diameter is chosen such that an annular gap for gap filtration of the pilot fluid is formed with the wall of the pilot channel. The length of the annular gap then corresponds to the entire peripheral length of the insert body or the length of the inner periphery of the pilot channel, permitting choosing the gap width to be small enough even for fine dirt particles to be reliably retained.

An especially large reduction of the effective baffle opening size and thus of the pilot volume flow can be achieved when a second baffle bore is connected downstream of the baffle bore located in the insert body of the pilot channel.

In one alternative exemplary embodiment characterized by an especially simple construction, a flow baffle device in the pilot channel extends with a channel axis extending radially to the longitudinal axis in the wall of the valve piston from its inner bore to a peripheral section of the valve piston. The peripheral section has been reduced in diameter. A device for filtration of the pilot fluid is on an outside edge region of the peripheral section which has been reduced in diameter.

In this design, an annular gap extending over the entire peripheral length of the valve piston for gap filtration of the pilot fluid can be made in an especially simple manner. Since the valve piston in the peripheral region extends between the edge of the peripheral section reduced in diameter, which edge is adjacent to the front, and a section connected to the fluid inlet in the closed position. The section has an outside diameter chosen such that an annular gap for gap filtration is formed with the wall of the valve housing.

The valve according to the invention can be closed when de-energized, with a magnet system attracting when energized. In this case, the arrangement can be made such that the actuating element is pressurized by an energy storage, preferably a spring arrangement, for movement blocking the pilot valve seat when the magnet system is de-energized, and can be pulled back from the pilot valve seat when the magnet system is energized. Alternatively, the valve can also be made as a version which is open when de-energized (with a thrusting magnet system).

In this specification, the invention is explained using the example of a piloted proportional throttle valve, because the reduction of the opening sizes of the pilot baffle bore(s) and pilot valve seat enabled according to the invention is especially advantageous for throttle valves with respect to stable control behavior. But the use of a baffle device according to the invention with an integrated gap filter device, optionally in conjunction with a series connection of baffle bores, is generally also suitable for piloted valves of another design. A reduction of the amount of pilot fluid is desired, without increasing the risk of fouling. Here, examples can be piloted pressure limitation and pressure control valves.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3A is a side elevational view in section of a proportional throttle valve according to a first exemplary embodiment of the invention, drawn detached and slightly enlarged relative to FIG. 1.

FIG. 3B is a hydraulic switching symbol for the valve according to the invention.

DETAILED DESCRIPTION OF THE INVENTION

Figure 1:
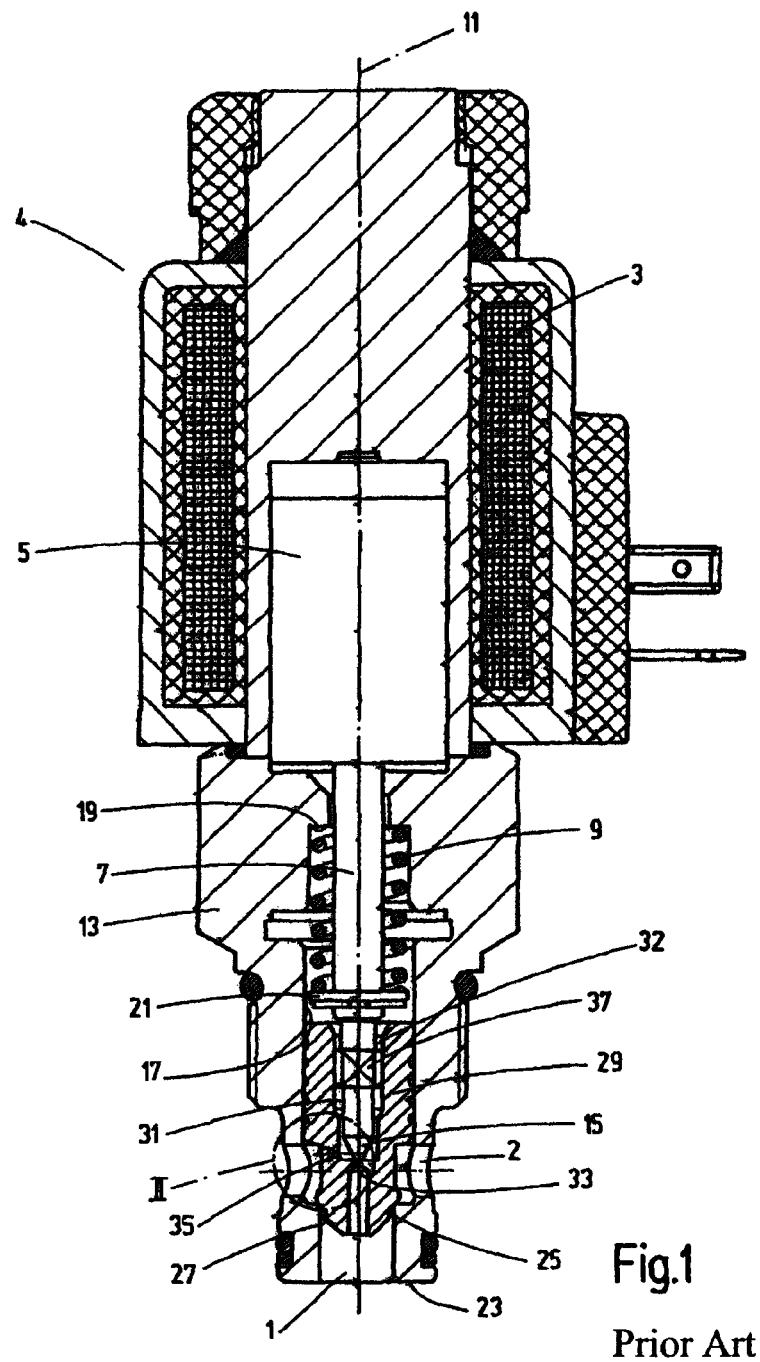
FIG. 1 is a side elevational view in section of a piloted proportional throttle valve in a seat version according to a conventional design.

The known or conventional piloted proportional throttle valve in a seat execution as shown in FIG. 1 is provided with an electrically triggerable magnet system 4. These magnet systems for triggering valves are relatively well known in the prior art (DE 44 16 279 A1). A magnetic armature 5 can be triggered by an actuating coil 3 of the magnet system 4. In the illustrated embodiment, the magnet system 4 is made as a pulling, opened proportional magnet, which in the energized state moves the magnet armature 5 and thus an actuating element 7 connected to the armature from bottom to top, as viewed in FIG. 1. In the de-energized state the armature 5 and thus the actuating element 7 are set back downward by an energy storage device formed by a compression spring 9; i.e., it is set into an axial position with respect to the longitudinal axis 11 corresponding to the closed state of the throttle valve.

Figure 2:
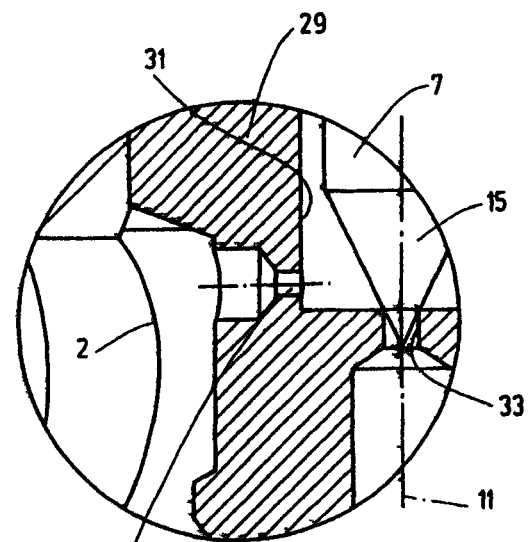
FIG. 2 is a side elevational view in section of an extract of the region designated as II in FIG. 1, greatly enlarged relative to FIG. 1.

The housing of the magnet system 4 is connected to the valve housing 13 with the formation of a seal. The actuating member 7 extends in the continuous bore 17 of the housing concentric to the longitudinal axis 11. The tapering end of the member 7 forms a pilot valve cone 15. The bore 17 in the valve housing 13 is stepped. A step 19 adjacent to the magnet system 4 forms the support for the spring 9 whose other end is supported on the collar 21 of the actuating member 7. In the vicinity of the exit end 23 of the valve housing 13 on which the valve fluid outlet port 1 is located, a main or piston valve seat 25 is formed. Piston valve seat 25 interacts with the precision control surface 27 on the end of a valve piston 29 acting as a main valve body. The valve piston 29 is guided to be able to move peripherally in the longitudinal direction in the section of the housing bore 17 which, as viewed in FIG. 1, adjoins the fluid inlet port 2 at the top. The valve piston 29 for its part has an inner bore 31 concentric to the longitudinal axis 11 and tapering at a distance from the end facing the port 1 to form a pilot valve seat 33. As best illustrated in FIG. 2, pilot valve seat 33 interacts with the pilot valve cone 15 on the end of the actuating member 7. As most clearly illustrated in FIG. 2, proceeding from the fluid port 2, a baffle bore 35 extends in the valve piston 29 into its inner bore 31, allowing a fluid pressure on the back of the valve piston 29 to build up from the fluid port 2. This back pressure pressurizes the valve piston 29 in FIG. 1 downwardly into the closed position in which its control surface 27 adjoins the main valve seat 25 to close it.

In the section located above the pilot valve seat 33 in FIG. 1, the inner bore 31 forms a guide section 32 used as a slide guide for a guide body 37 of the actuating member 7, which body has guide edges.

The pressure build-up on the back of the valve piston 29 by the fluid entering the inner bore 31 of the valve piston 29 from the port 2 via the baffle bore 35 keeps the valve piston 29 in its closed position. If the actuating member 7 is retracted by energizing the magnet system 4 so that the valve cone 15 is raised off the pilot valve seat 33, on the back of the piston a pressure drop occurs. The fluid pressure acting on the valve piston 29 from the port 2 causes an opening motion of the piston 29 causing fluid to exit at the port 1. The pilot fluid flow resulting from the dimensioning of the baffle bore 35 and of the pilot valve seat 33 is superimposed on this fluid flow causing the opening motion of piston 29.

Figure 4:
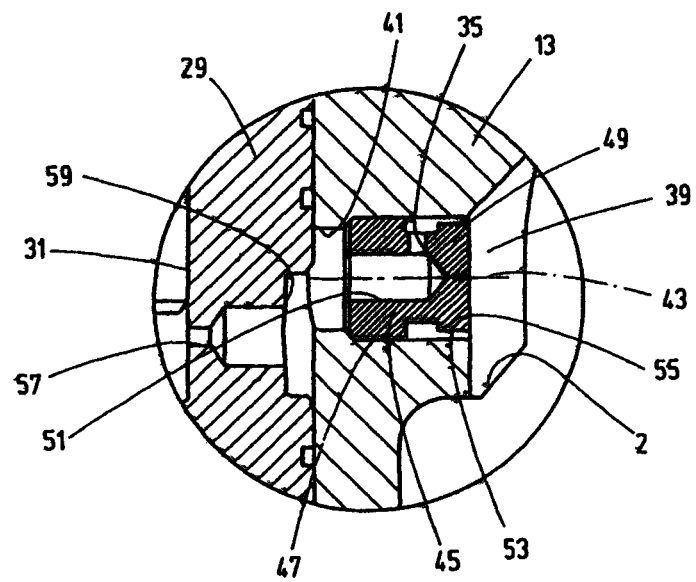
FIG. 4 is a side elevational view in section of an extract of the region IV in FIG. 3, greatly enlarged compared to FIG. 3.

The first exemplary embodiment of the valve according to the invention that is shown in FIGS. 3A, 3B and 4 differs from FIGS. 1 and 2 especially in that, in place of the baffle bore 35 extending directly through the wall of the piston 29 from the port 2 into the inner bore 31 of the piston 29, a flow baffle device 39 is installed in a pilot channel 41 extending with a channel axis 43 radially to the longitudinal axis 11 within the wall of the valve housing 13. Reference is made to FIG. 4 for details of this baffle device 39. The baffle device 39, more specifically, is a combined baffle and filter device. It has a round insert body 45 whose inner plug section 47 facing the inner mouth of the pilot channel 41 is held appropriately in the round pilot channel 41. This inner plug section 47 is adjoined by an outer section 49 having a smaller outside diameter compared to the plug section 47, this outside diameter being stepped. From the end of the plug section 47, a blind hole 51 concentric to the channel axis 43 extends as far as the outer section 49.

From the region of the base of the blind hole 51, the baffle bore 35 extends radially to the axis 43 and extends to the stepped outside periphery of the outer section 49 reduced in diameter. This section, as mentioned above, is stepped. More accurately, the outer mouth of the baffle bore 35 is adjoined by an end section 53 again increased in diameter, whose diameter is chosen such that with the wall of the pilot channel 41, a fine annular gap 55 is formed and acts as a gap filter via which pilot fluid can travel to the baffle bore 35 from the port 2. The gap width of the annular gap 55 is chosen such that even fine dirt particles are retained. Since the length of the annular gap 55, corresponds to the entire peripheral length of the outer end section 53 and of the inner periphery of the pilot channel 41, particle settling on a fraction of the length of the annular gap does not lead to clogging of the fluid passage. Even for an opening size of the baffle bore 35 dimensioned to be very small, fail safe operation is ensured.

For especially advantageous exemplary embodiments, in a similar positional arrangement, as is the case in the baffle bore 35 which is conventional in the prior art, in the valve piston 29 itself an additional, second baffle bore 57 is connected downstream of the baffle bore 35 in the baffle device 39. This additional baffle bore 57 is located in a peripheral section 59 of the valve piston 29, which section is reduced in diameter and connects this peripheral section 59 to the inner bore 31 in the valve piston 29. The axial position of the peripheral section 59 is chosen such that, with the axial positions of the valve piston 29 which occur in operation, the downstream second baffle bore 57 is aligned to the inner channel mouth of the pilot channel 41.

Figure 5:
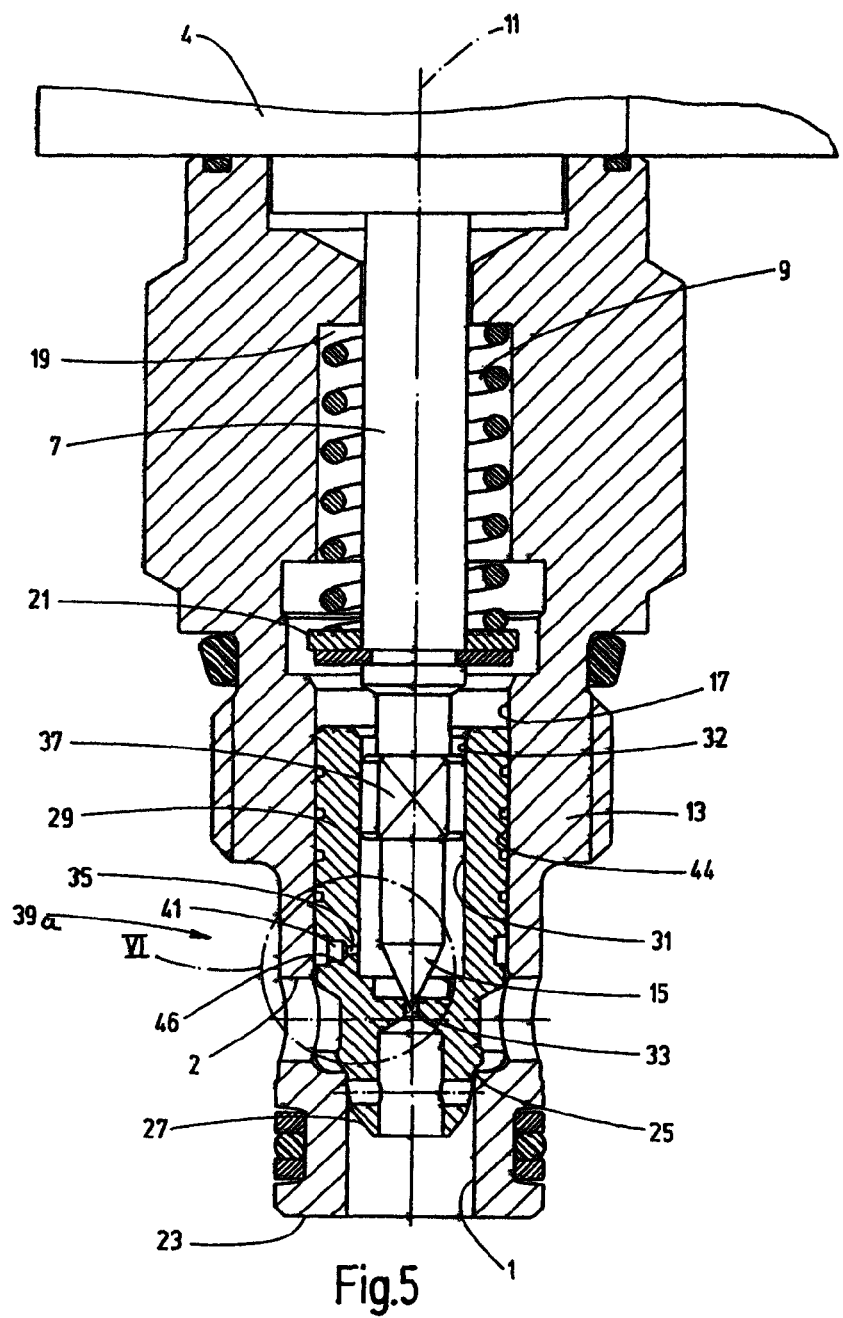
FIG. 5 is a side elevational view in section of a proportional throttle valve according to a second exemplary embodiment of the invention.
Figure 6:
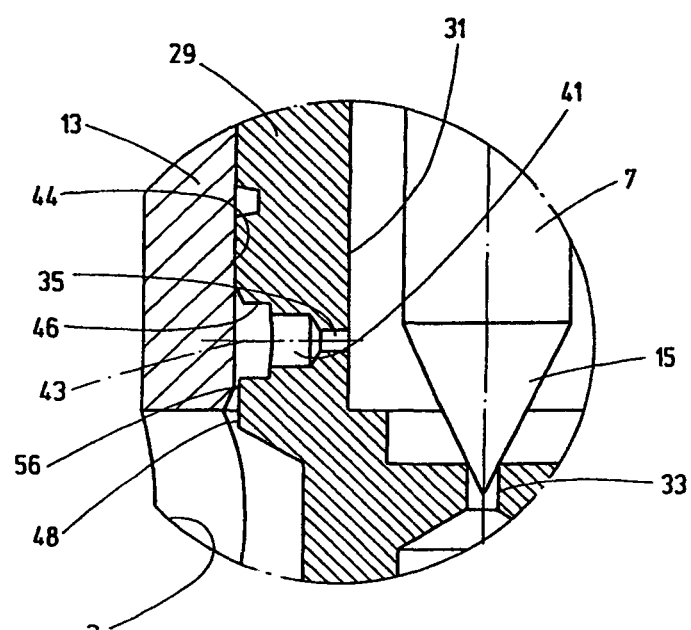
FIG. 6 is a side elevational view in section of an extract of the region designated as VI in FIG. 5, greatly enlarged relative to FIG. 5.

FIGS. 5 and 6 illustrate a modified or second exemplary embodiment in which the pilot channel 41 extends in a direction radially to the longitudinal axis 11 exclusively through the wall of the valve piston 29 to the wall 44 of the valve housing 13. In the end region adjoining the inner bore 31, the pilot channel 41 forms the baffle bore 35. In its radially outer region the pilot channel 41 undergoes transition into a peripheral section 46 of the valve piston 29 reduced in diameter. Between the peripheral section 46 forming an annulus with the wall 44 of the valve housing 13 and the peripheral section 48 (FIG. 6) of the valve piston 29 connected to the fluid inlet 2, the piston diameter is chosen such that with the wall 44 of the valve housing 13 an annular gap 56 (see FIG. 6) is created forming the device for gap filtration of the pilot fluid. According to the peripheral length of the valve piston 29 and the resulting length of the annular gap 56, it can be made so narrow that even extremely small dirt particles are reliably retained.

The use of a flow baffle device 39a provided according to the invention in the form of a combined baffle and gap filter device for the smallest possible sizes of the baffle opening ensures fail safe operation and optimal operating behavior even at high pressure differences and small fluid volumetric flows. Especially good conditions are achieved particularly when an additional second baffle opening 57 is connected downstream of the baffle bore 35 of the baffle device 39a.

The valve according to the invention can be used for medium and large volumetric flows, especially when a leak-free seal is necessary in the closed state and the valve is to be used both with very low input pressures at the port 2 (roughly 1 bar) and with high pressures (up to roughly 350 bar).

While various embodiments have been chosen to illustrate the invention, it will be understood by those skilled in the art that various changes and modifications can be made therein without departing from the scope of the invention as defined in the appended claims.

What is claimed is:

1. A piloted proportional throttle valve, comprising:
   a valve housing having a fluid inlet, a fluid outlet, a longitudinal axis and a piston valve seat;
   a valve piston guided to move in said valve housing along said longitudinal axis and having a front and a back, fluid pressure on said back pressing said valve piston against said piston valve seat, said valve piston having a bore connecting said back with said fluid outlet facing said front to reduce pressure on said back of said valve piston for an opening motion of said valve piston away from said piston valve seat;
   a pilot valve device having an actuating member movable along said longitudinal axis by an electrically triggerable magnet system and interacting with a pilot valve seat in said bore of said valve piston, said pilot valve seat being cleared for opening motion of said valve piston and being closed by said actuating member to build up fluid pressure on said back of said valve piston by a supply of pilot fluid to press said valve piston against said piston valve seat; and
   a flow baffle device in a pilot channel extending radially relative to said longitudinal axis in a wall of said housing between said back of said valve piston and said fluid inlet of said housing and having a gap filter for the pilot fluid, said pilot channel having an inner channel mouth in fluid communication with said back of said valve piston and on outer channel mouth in fluid communication with said fluid inlet flow device having a blind bore.

2. A piloted proportional throttle valve according to claim 1 wherein
   said pilot channel comprises a circular channel bore holding said baffle device having a round insert body.

3. A piloted proportional throttle valve according to claim 2 wherein
   said insert body includes a plug section facing said inner channel mouth and fitting in a channel bore of said pilot channel and includes an outer section having a reduced diameter relative to said plug section and having a baffle bore and said gap filter.

4. A piloted proportional throttle valve according to claim 3 wherein
   said plug section comprises said blind bore therein extending away from said inner channel mouth into said outer section and a baffle bore extending radially relative to a channel axis of said pilot channel, said baffle bore extending between said blind bore and an outside of said outer section of said insert body with the reduced diameter.

5. A piloted proportional throttle valve according to claim 4 wherein
said bore of said valve piston comprises a guide section extending from said back of said valve piston and receiving and guiding said actuating member, said actuating member having a valve cone engageable with said pilot valve seat; and
said valve piston has a peripheral section of reduced diameter with a passage for entry of the pilot fluid flowing through said baffle device into said guide section.

6. A pilot proportional throttle valve according to claim 5 wherein
said peripheral section of said valve piston has an axial length and an axial position on said valve piston connected to said inner channel mouth of said pilot channel in axial positions of said valve piston.

7. A piloted proportional throttle valve according to claim 5 wherein
said passage of said valve piston has a second baffle bore therein connected downstream of said baffle bore in said insert body of said baffle device.

8. A piloted proportional throttle valve according to claim 1 wherein
said actuating element is pressurized by a spring into a position engaging and closing said pilot valve seat when said magnet system is deenergized and can be moved away from said pilot valve seat when said magnet system is energized.

9. A piloted proportional throttle valve, comprising:
a valve housing having a fluid inlet, a fluid outlet, a longitudinal axis and a piston valve seat;
a valve piston guided to move in said valve housing along said longitudinal axis and having a front and a back, fluid pressure on said back pressing said valve piston against said piston valve seat, said valve piston having a bore connecting said back with said fluid outlet facing said front to reduce pressure on said back of said valve piston for an opening motion of said valve piston away from said piston valve seat;
a pilot valve device having an actuating member movable along said longitudinal axis by an electrically triggerable magnet system and interacting with a pilot valve seat in said bore of said valve piston, said pilot valve seat being cleared for opening motion of said valve piston and being closed by said actuating member to build up fluid pressure on said back of said valve piston by a supply of pilot fluid to press said valve piston against said piston valve seat; and
a flow baffle device in a pilot channel extending radially relative to said longitudinal axis in a wall of said valve housing between the back of said valve piston and said fluid inlet of said valve housing and having a gap filter for the pilot fluid, said pilot channel having an inner channel mouth in fluid communication with said back of said valve piston and on outer channel mouth in fluid communication with said fluid inlet, said pilot channel including a circular channel bore holding said baffle device having a round insert body, said insert body including a plug section facing said inner channel mouth and fitting in a channel bore of said pilot channel and including an outer section having a reduced diameter relative to said plug section and having a baffle bore and said gap filter, said plug section including a blind bore therein extending away from said inner channel mouth into said outer section and a baffle bore extending radially relative to a channel axis of said pilot channel, said baffle bore extending between said blind bore and an outside of said outer section of said insert body with the reduced diameter, the reduced diameter of said outer section of said insert body being stepped to have a first region of length in which said baffle bore discharges, said first region having a smaller diameter then an end-side region of length following to the outside, said smaller diameter forming an annular gap for said gap filter with a wall of said pilot channel.

10. A piloted proportional throttle valve according to claim 9 wherein
said bore of said valve piston comprises a guide section extending from said back of said valve piston and receiving and guiding said actuating member, said actuating member having a valve cone engageable with said pilot valve seat; and
said valve piston has a peripheral section of reduced diameter with a passage for entry of the pilot fluid flowing through said baffle device into said guide section.

11. A pilot proportional throttle valve according to claim 10 wherein
said peripheral section of said valve piston has an axial length and an axial position on said valve piston connected to said inner channel mouth of said pilot channel in axial positions of said valve piston.

12. A piloted proportional throttle valve according to claim 10 wherein
said passage of said valve piston has a second baffle bore therein connected downstream of said baffle bore in said insert body of said baffle device.

13. A piloted proportional throttle valve according to claim 9 wherein
said actuating element is pressurized by a spring into a position engaging and closing said pilot valve seat when said magnet system is deenergized and can be moved away from said pilot valve seat when said magnet system is energized.

14. A piloted proportional throttle valve, comprising:
a valve housing having a fluid inlet, a fluid outlet, a longitudinal axis and a piston valve seat;
a valve piston guided to move in said valve housing along said longitudinal axis and having a front and a back, fluid pressure on said back pressing said valve piston against said piston valve seat, said valve piston having an inner bore connecting said back with said fluid outlet facing said front to reduce pressure on said back of said valve piston for an opening motion of said valve piston away from said piston valve seat;
a pilot valve device having an actuating member movable along said longitudinal axis by an electrically triggerable magnet system and interacting with a pilot valve seat in said inner bore of said valve piston, said pilot valve seat being cleared for opening motion of said valve piston and being closed by said actuating member to build up fluid pressure on said back of said valve piston by a supply of pilot fluid to press said valve piston against said piston valve seat; and
a flow baffle device in a pilot channel extending radially relative to said longitudinal axis in a wall of said valve piston between the back of said valve piston and said fluid inlet of said housing and having a gap filter for the pilot fluid, said pilot channel extending from said inner bore of said valve piston to a peripheral section of said valve piston having a reduced diameter, said gap filter being on an outer edge region of said peripheral section of reduced diameter
said valve piston has an outside diameter in a peripheral region extending between one edge of said peripheral section of reduced diameter adjacent said front of said valve piston and a section of said valve piston connected to said fluid inlet in the closed position of said valve piston, said outside diameter forming an annular gap for said gap filter with a wall of said valve housing.

15. A piloted proportional throttle valve according to claim 14 wherein
said bore of said valve piston comprises a guide section extending from said back of said valve piston and receiving and guiding said actuating member, said actuating member having a valve cone engageable with said pilot valve seat; and
said peripheral section of reduced diameter has a passage for entry of the pilot fluid flowing through said baffle device into said guide section.

16. A pilot proportional throttle valve according to claim 15 wherein
said peripheral section of said valve piston has an axial length and an axial position on said valve piston connected to said inner channel mouth of said pilot channel in axial positions of said valve piston.

17. A piloted proportional throttle valve according to claim 15 wherein
said passage of said valve piston has a second baffle bore therein connected downstream of said baffle bore in said insert body of said baffle device.

18. A piloted proportional throttle valve according to claim 14 wherein
said actuating element is pressurized by a spring into a position engaging and closing said pilot valve seat when said magnet system is deenergized and can be moved away from said pilot valve seat when said magnet system is energized.

* * * * *